United States Patent
Wang et al.

(10) Patent No.: US 11,555,996 B2
(45) Date of Patent: Jan. 17, 2023

(54) METHOD AND SYSTEM FOR ANALYZING 2D MATERIAL THIN FILM

(71) Applicant: NATIONAL CHUNG CHENG UNIVERSITY, Chia-Yi (TW)

(72) Inventors: Hsiang-Chen Wang, Chiayi (TW); Kai-Chun Li, Kaohsiung (TW); Kai-Hsiang Ke, Chiayi (TW); Chun-Wen Liang, Hsinchu (TW)

(73) Assignee: NATIONAL CHUNG CHENG UNIVERSITY, Chia-Yi (TW)

( * ) Notice: Subject to any disclaimer, the term of this patent is extended or adjusted under 35 U.S.C. 154(b) by 0 days.

(21) Appl. No.: 17/235,302

(22) Filed: Apr. 20, 2021

(65) Prior Publication Data
US 2021/0349299 A1 Nov. 11, 2021

(30) Foreign Application Priority Data
May 5, 2020 (TW) .................................. 109114945

(51) Int. Cl.
*G02B 21/36* (2006.01)
*G01J 3/44* (2006.01)
*G01J 3/28* (2006.01)
*G01N 21/65* (2006.01)
*G01N 21/17* (2006.01)

(52) U.S. Cl.
CPC .......... *G02B 21/367* (2013.01); *G01J 3/2823* (2013.01); *G01J 3/44* (2013.01); *G01N 21/658* (2013.01); *G02B 21/361* (2013.01); *G01N 2021/1765* (2013.01)

(58) Field of Classification Search
CPC .................................................. G06K 9/6267
See application file for complete search history.

(56) References Cited

U.S. PATENT DOCUMENTS

| | | | |
|---|---|---|---|
| 2014/0376799 A1* | 12/2014 | Wang | G06T 7/001 382/141 |
| 2015/0317537 A1* | 11/2015 | Jain | G06V 10/42 382/128 |
| 2019/0188446 A1* | 6/2019 | Wu | G06T 3/0075 |
| 2019/0294108 A1* | 9/2019 | Ozcan | G03H 1/0866 |

FOREIGN PATENT DOCUMENTS

| | | | | |
|---|---|---|---|---|
| WO | WO-2005083352 A1 * | 9/2005 | | G01B 11/0625 |
| WO | WO-2019100169 A1 * | 5/2019 | | A61B 3/0025 |

* cited by examiner

*Primary Examiner* — Tarifur R Chowdhury
*Assistant Examiner* — Roberto Fabian, Jr.
(74) *Attorney, Agent, or Firm* — Saliwanchik, Lloyd & Eisenschenk (57) ABSTRACT

A method for analyzing 2D material thin film and a system for analyzing 2D material thin film are disclosed. The detection method includes the following steps: capturing sample images of 2D material thin films; measuring the 2D material thin films by a Raman spectrometer; performing a visible light hyperspectral algorithm on the sample images by a processor to generate a plurality of visible light hyperspectral images; performing a training and validation procedure, performing an image feature algorithm on the visible light hyperspectral images, and establishing a thin film prediction model based on a validation; and capturing a thin-film image to be measured by the optical microscope, performing the visible light hyperspectral algorithm, and then generating a distribution result of the thin-film image to be measured according to an analysis of the thin film prediction model.

10 Claims, 5 Drawing Sheets

METHOD AND SYSTEM FOR ANALYZING 2D MATERIAL THIN FILM

CROSS-REFERENCE TO RELATED APPLICATION

This application claims priority from Taiwanese Application No. 109114945, filed on May 5, 2020, which is hereby incorporated by reference in its entirety.

BACKGROUND

1. Technical Field

The present disclosure relates to a method and a system for analyzing two-dimensional (2D) material thin film, more particularly to a method and a system for analyzing 2D material thin film that utilize a visible light hyperspectral image and a classification algorithm.

2. Description of the Related Art

The 2D materials are substances that have gained wide attention in the next generation of electronic and optoelectronic elements. Materials with a single-layered atomic-level thicknesses may be segregated from the 2D materials with physical or chemical methods, in which the structure the materials may in a single element form or mixed element staggered form. The single element form may include graphene, silicon, germane, tinene, phosphorene, boron, etc., which are categorized as allotropic materials; the mixed element staggered form may include layered structural materials such as hexagonal boron nitride, transition metal chalcogenide compounds, transition metal-carbon (nitrogen) compounds, etc., or 2D materials in a single layer formed by the segregation of the three-dimensional bulk materials including transition metal oxides, hydroxides, etc.

Due to the nature of the two-dimensional limitation of the material, the thickness thereof is usually limited to a scale of a few nanometers, or even to a size of a single atom (such as graphene, hexagonal boron nitride, etc.), resulting in the surface properties and bulk properties having significant differences. Therefore, the realization of single-layered 2D materials, characteristics of special rigidity, flexibility, transparency, optical properties, thermal conductivity, machinery, and high carrier mobility may be provided to such materials, with the advantages of lightweight and low energy consumption and miniaturization of elements. This not only possesses great potentials for applications in electronics, optics, optoelectronics, electronic spin, battery materials, quantum information, and biomedicine, and but may also bring revolutionary innovation and change in rules of the game for future technological development and industries. The 2D materials may further push the development of nanotechnology applications beyond the limits of atomic-level technology and are applied to a wide range of technological applications.

The property of a 2D material is closely related to its structure, and particularly, the number of layers is one of the main factors that the property of the 2D material is determined. According to the number of layers, the energy band structure of the 2D material may vary. Only the 2D material in a single layer may become direct bandgap semiconductors. The energy band structure of a multilayered 2D material is even more complicated, in which small variations may lead to significant differences in their properties. Therefore, it is important to efficiently and accurately identify the number of layers of such a 2D material.

Currently, the number of layers of the 2D material thin film is mainly analyzed using Atomic Force Microscopy (AFM), Micro-RAMAN Spectrometer, Scanning Electron Microscope (SEM), Transmission Electron Microscopy (TEM), and Multiphoton Laser Scanning Microscopy, etc. However, the AFM has a fairly limited scanning range with a time-consuming process, which is not suitable for the rapid measurement of large areas. For the Micro-RAMAN Spectrometer, due to the low thickness dependence of modes of Raman spectra, it is difficult to make clear and accurate predictions, also making it not suitable for large area analysis. The SEM may only determine the relative number of layers according to the different brightness of the surroundings, which is suitable for fast screening but not for accurate determination of the number of layers. The TEM is easily limited to the thickness and uniformity of the sample, thus affecting image quality, and requires more complicated preparation process for the samples to be analyzed. As for the Multiphoton Laser Scanning Microscopy, after the sample receives pulsed laser excitation to generate fluorescence light, the fluorescence signal is distinguished by different band-pass filters.

Despite many instruments for analyzing the number of layers of 2D materials, each method has its limitations. Accordingly, to efficiently analyze the 2D material thin film on a large area, the inventor of the present disclosure has designed a method and a system for analyzing 2D material thin films in an effort to tackle deficiencies in the prior art and further to enhance the implementation and application in industries.

SUMMARY

In view of the aforementioned conventional problem, the objectives of the present disclosure are to provide a method for analyzing 2D material thin film and a system for analyzing 2D material thin film to solve the problem of conventional methods or devices that are difficult to inspect or analyze 2D material thin films efficiently on a large area.

According to one objective of the present disclosure, a method for analyzing 2D material thin film is provided, including the following steps: capturing sample images of a plurality of 2D material thin films by an optical microscope and storing the plurality of sample images in a storage device; measuring the plurality of 2D material thin films by a Raman spectrometer and storing a plurality of layers and a plurality of positions in the storage device; accessing the storage device by a processor and performing a visible light hyperspectral algorithm on the plurality of sample images to generate a plurality of visible light hyperspectral images; performing a training and validation procedure by the processor, performing an image feature algorithm on the plurality of visible light hyperspectral images, and establishing a thin film prediction model based on a validation of the plurality of layers and the plurality of positions; capturing a thin-film image to be measured by the optical microscope, performing the visible light hyperspectral algorithm by the processor, and then generating a distribution result of the thin-film image to be measured according to an analysis of the thin film prediction model; and outputting the distribution result by an output device.

According to another objective of the present disclosure, a system for analyzing 2D material thin film is provided, including an optical microscope, a Raman spectrometer, a storage device, a processor, and an output device. The optical microscope is utilized for capturing a plurality of 2D material thin films to generate a plurality of sample image and capturing a thin-film image to be measured. The Raman spectrometer is utilized for measuring the plurality of 2D material thin films to obtain a plurality of layers and a plurality of positions. The storage device is connected to the optical microscope and the Raman spectrometer and stores the plurality of sample images and the plurality of layers and the plurality of positions corresponding thereto. The processor is connected to the storage device and executes a plurality of instructions to perform the following steps: accessing the plurality of sample images and performing a visible light hyperspectral algorithm to generate a plurality of visible light hyperspectral images; performing a training and validation procedure, performing an image feature algorithm on the plurality of visible light hyperspectral images, and establishing a thin film prediction model based on a validation of the plurality of layers and the plurality of positions; and accessing a thin-film image to be measured, performing the visible light hyperspectral algorithm, and then generating a distribution result of the thin film prediction model according to an analysis of the thin film prediction model. The distribution result is then produced by the output device.

Preferably, the visible light hyperspectral algorithm has a wavelength range of 380 to 780 nm and a spectral resolution of 1 nm.

Preferably, the training and validation procedure includes a step of dividing the plurality of visible light hyperspectral images into a training set, a validation set, and a test set.

Preferably, the image feature algorithm includes a decision tree (DT) analysis, a principal component (PC) analysis, and a deep neural network (DNN) analysis.

Preferably, the deep neural network analysis includes a deep neural network (DNN), a one-dimensional convolutional neural network (1D-DNN), and a three-dimensional convolutional neural network (3D-DNN).

As mentioned above, the method for analyzing 2D material thin film and the system for analyzing 2D material thin film of the present disclosure may have one or more advantages as follows:

(1) The method for analyzing 2D material thin film and the system for analyzing 2D material thin film may convert an original image obtained by an optical microscope into a visible light hyperspectral image and analyze the layer distribution of 2D material thin film by an inspection model, thus eliminating the disadvantage of not being able to conduct large area analysis by existing technology.

(2) The method for analyzing 2D material thin film and the system for analyzing 2D material thin film are capable of building analytical models by machine learning or deep learning algorithms. With the establishment of the method and system with automatic determination, the efficiency of 2D material thin film analysis may be enhanced.

(3) The method for analyzing 2D material thin film and the system for analyzing 2D material thin film may enhance the accuracy of the analysis of a thin-film image to be measured and analytical results by the implementation of a network model for different deep learning with the validation of Raman measurement data.

BRIEF DESCRIPTION OF THE DRAWINGS

To make the technical features, content, and advantages of the present disclosure and the achievable effects more obvious, the present disclosure is described in detail together with the drawings and in the form of expressions of the embodiments as follows.

DESCRIPTION OF THE PREFERRED EMBODIMENTS

To facilitate the review of the technical features, contents, advantages, and achievable effects of the present disclosure, the embodiments together with the drawings are described in detail as follows. However, the drawings are used only for the purpose of indicating and supporting the specification, which is not necessarily the real proportion and precise configuration after the implementation of the present disclosure. Therefore, the relations of the proportion and configuration of the attached drawings should not be interpreted to limit the actual scope of implementation of the present disclosure.

All terms used herein (including technical and scientific terms) have the meanings commonly understood by a person of ordinary skill in the art. It should be further understood that, unless explicitly defined herein, the terms such as those defined in commonly used dictionaries should be interpreted as having definitions consistent with their meaning in the context of the related art and the present disclosure, and should not be construed as idealized or overly formal.

A 2D material includes a single element form or mixed element staggered form. The single element form includes graphene or silicene having other 2D materials combined with heterostructure, germanene, stanene, phosphorene, and borophene, etc. The mixed element staggered form includes layered structural materials such as hexagonal boron nitride (h-BN), transition metal chalcogenide compounds (TMDCs), transition metal-carbon (nitrogen) compounds (MXenes), etc., or 2D materials in a single layer formed by the segregation of the three-dimensional bulk materials including transition metal oxides (TM oxides), hydroxides, etc. The chemical formula of TMDCs is generally $MX_2$, where M is transition metal and X is chalcogen. The TMDCs is a transition metal of groups IVA to VIIA such as titanium (Ti), zirconium (Zr), hafnium (Hf), chromium (Cr), molybdenum (Mo), tungsten (W), etc., and chalcogenides such as layered compounds formed by sulfur (S), selenium (Se), and thorium (Te), or other layered materials such as $VSe_2$, $NbSe_2$, $TaS_2$, $TiS_2$, $TiSe_2$, $TiTe_2$, $MoS_2$, $WSe_2$, etc. The chemical formula of the transition metal-carbon (nitrogen) compounds (MXenes) is generally $M_{n+1}X_n$, where M is transition metal and X is carbon or nitrogen such as $Mo_2C$, $W_2C$, WC, or TaC.

In the present embodiment, molybdenum disulfide ($MoS_2$) is selected as an example for explanation. However, the present disclosure is not limited thereto. In other embodiments, other 2D materials mentioned above may also be used as objects for analysis and measurement. Molybdenum disulfide is a prototype semiconductor material formed by a stacked hexagonal S—Mo—S layered structure. This layer-to-layer structure bonded by the weaker Van der Waals force is referred to as a single layer, with the properties of great direct energy silicon, excellent on/off ratio, and high carrier mobility. Molybdenum disulfide has high mechanical ductility owing to strong covalent bonds and is regarded as an important material for nano-size electronic and optoelectronic components because of its excellent elasticity.

Figure 1:
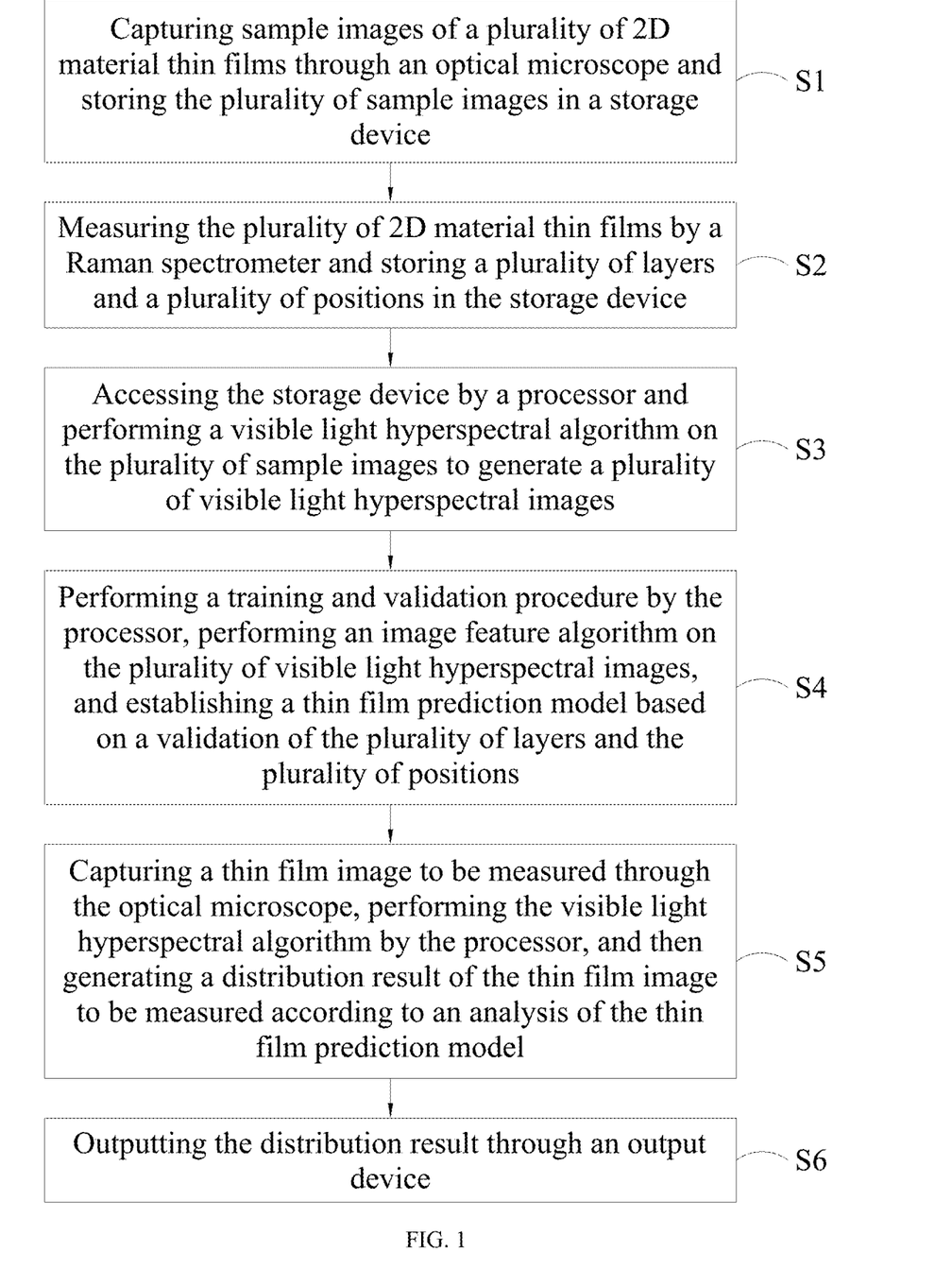
FIG. 1 is a flowchart of the method for analyzing 2D material thin film according to an embodiment of the present disclosure.

Referring to FIG. 1, which is a flowchart of the method for analyzing 2D material thin film according to an embodiment of the present disclosure. As shown in the figure, the method for analyzing 2D material thin film includes the following steps (S1 to S5):

Step S1: Capturing sample images of a plurality of 2D material thin films with an optical microscope and storing the plurality of sample images in a storage device. In the preparation of a 2D material thin film, for example, a molybdenum disulfide thin film, the chemical vapor deposition (CVD) is usually used. High temperature is used to decompose sulfur and make it react with $MoO_3$, and the generated $MoS_2$ molecules after the reaction are precipitated on the substrate of a sapphire or silicon dioxide ($SiO_2$)/Si to form a thin film of molybdenum disulfide. Several factors, such as different gas flow rates introduced, precursor concentration, control of growth temperature, holding time, and selection of growth substrate may affect the structure of the molybdenum disulfide film in the manufacturing process. For each of the prepared 2D material thin films, respective sample images are taken by an optical microscope (OM) first and stored in the storage device. Related information to these sample images may be included in the data thereof, such as parameters for the manufacturing process, including deposition time, temperature, a substrate used, etc., and the corresponding sample images are stored in the storage device.

Step S2: Measuring the plurality of 2D material thin films by a Raman spectrometer and storing a plurality of layers and a plurality of positions in the storage device. Each 2D material thin film prepared in the aforementioned manufacturing process is further measured by the Raman spectrometer. Multiple positions are selected on each 2D material thin film, the spectral data at the selected positions are measured, the number of layers corresponding to the Raman measurements are recorded, and the position information and layer information at different positions on the 2D material thin film are stored in the storage device.

Step S3: Accessing the storage device by a processor and performing a visible light hyperspectral algorithm on the plurality of sample images to generate a plurality of visible light hyperspectral images. The main concept of visible-light hyper spectrum is to give a function of a spectrometer to the image taken by an image-capturing device in an ordinary optical microscope such that every pixel in the original image has spectral information. To achieve this technical concept, it is essential to find out the correlation matrix between the charge-coupled device (CCD) and the spectrometer in the optical microscope and establish a visible light hyperspectral image accordingly.

For the procedure of the visible light hyper spectrum, 24-color block images (sRGB, 8 bit) and 24-color block reflection spectrum data (wavelength range 380 to 780 nm, spectral resolution 1 nm) are respectively obtained firstly based on the standard of 24-color cards by the optical microscope and the spectrometer. Moreover, the 24-color block images and 24-color block reflection spectrum data are converted into an XYZ color space (CIE 1931 XYZ color space). Each of the conversion formulas is presented as follows:

For the image: sRGB color space is converted into an XYZ color space.

$$\begin{bmatrix} X \\ Y \\ Z \end{bmatrix} = [M_A][T] \begin{bmatrix} f(R_{sRGB}) \\ f(G_{sRGB}) \\ f(B_{sRGB}) \end{bmatrix} \times 100, 0 \le \begin{matrix} R_{sRGB} \\ G_{sRGB} \\ B_{sRGB} \end{matrix} \le 1 \quad (1)$$

Wherein $$[T] = \begin{bmatrix} 0.4104 & 0.3576 & 0.1805 \\ 0.2126 & 0.7152 & 0.0722 \\ 0.0193 & 0.1192 & 0.9505 \end{bmatrix} \quad (2)$$

$$f(n) = \begin{cases} \left(\frac{n+0.055}{1.055}\right)^{2.4}, & n > 0.04045 \\ \left(\frac{n}{12.92}\right), & \text{otherwise} \end{cases} \quad (3)$$

$$[M_A] = \begin{bmatrix} X_{SW}/X_{CW} & 0 & 0 \\ 0 & Y_{SW}/Y_{CW} & 0 \\ 0 & 0 & Z_{SW}/Z_{CW} \end{bmatrix} \quad (4)$$

In terms of the image, since the charge-coupled device itself may be affected by the correction of image signal processor (ISP) before being received by software and displayed on the computer screen, the image (JPEG, 8 bit) stores data based on the standard of the sRGB color space. Before the image is converted from the sRGB color space to the XYZ color space, the respective R, G, B values (0 to 255) must be converted into a smaller scale range (0 to 1). Furthermore, the sRGB value is converted into a linear RGB value by gamma function conversion (Equation (3)). Lastly, the linear RGB value is converted into an XYZ value normalized in the XYZ color space by transformation matrix T (Equation (1) and Equation (2)). Since in sRGB color space, the white point is normalized as D65 ($X_{CW}$, $Y_{CW}$, $Z_{CW}$), rather than the white point ($X_{SW}$, $Y_{SW}$, $Z_{SW}$) of the light source for measurement, for the obtained XYZ value, it is necessary to convert the white point of D65 into a white point of the light source for the measurement with the color adaptation transformation matrix MA (Equation (4)), in order to obtain the XYZ value ($XYZ_{Camera}$) under the actual measured light source.

For the spectrometer: The reflection spectrum data is converted into an XYZ color space.

$$X = k \int_{380\,nm}^{780\,nm} S(\lambda) R(\lambda) \bar{x}(\lambda) d\lambda \quad (5)$$

$$Y = k \int_{380\,nm}^{780\,nm} S(\lambda) R(\lambda) \bar{y}(\lambda) d\lambda \quad (6)$$

$$Z = k \int_{380\,nm}^{780\,nm} S(\lambda) R(\lambda) \bar{z}(\lambda) d\lambda \quad (7)$$

Wherein $k = 100 / \int_{380\,nm}^{780\,nm} S(\lambda) \bar{y}(\lambda) d\lambda$ \quad (8)

In terms of the spectrometer, if the reflection spectrum data (380 to 780 nm, 1 nm) is converted into an XYZ color space, it is necessary to have the XYZ color matching functions (CMF) $\bar{x}(\lambda)$, $\bar{y}(\lambda)$, $\bar{z}(\lambda)$ and the light source spectrum $S(\lambda)$ when the camera is used for the picture taking. Since the Y value of the XYZ color space is proportional to the brightness, the Y value (maximum brightness) of the light source spectrum is calculated in Equation (8), and the Y value is normalized to 100 to obtain the brightness ratio k. Lastly, the reflection spectrum data is converted into the XYZ value ($XYZ_{Spectrum}$) normalized in the XYZ color space in Equation (5) to Equation (7).

After $XYZ_{camera}$ and $XYZ_{Spectrum}$ data are obtained with the above conversion equations, $XYZ_{Spectrum}$ is then used as the standard, and the $[X\ Y\ Z]^T$ matrix of $XYZ_{Camera}$ is expanded to a variable matrix V with calibration variables. In Equation (9), multiple regression analysis is performed. Lastly, the calibration coefficient matrix C used to calibrate the camera is obtained.

$$[C]=[XYZ_{Spectrum}]\times\text{pinv}([V]) \quad (9)$$

The variable matrix V is obtained according to the analysis of factors that may cause errors in the camera, wherein the factors include camera nonlinear response, camera dark current, inaccurate color filter separation, and color shift. The camera nonlinear response may be calibrated in the third-order equation, and the calibration variable of the nonlinear response is defined as $V_{Non\text{-}linear}$.

$$V_{Non\text{-}linear}=[X^3Y^3Z^3X^2Y^2Y^2XYZ1]^T$$

The camera dark current is usually a fixed value that does not change with the light received. A constant is regarded as dark current and the calibration variable of the dark current is defined as $V_{Dark}$.

$$V_{Dark}=[a]$$

The occurrence of the inaccurate color filter separation and the color shift may be deemed the problems with color matching. Since the camera image has been converted into the XYZ color space and it is necessary to consider the correlation between the X, Y, and Z values, and therefore permutations of X, Y, and Z are conducted to list all possibilities of the correlation, which are defined as $V_{Color}$.

$$V_{Color}=[XYZXYXZYZXYZ]^T$$

$V_{Color}$ is regarded as a base that is further multiplied with the nonlinear response calibration factor $V_{Non\text{-}linear}$. The result is normalized within the third order to avoid over-calibration. Lastly, $V_{Dark}$ is added to obtain the variable matrix V.

$$V=[X^3Y^3Z^3X^2Y\ X^2Z\ Y^2ZXY^2XZ^2YZ^2XYZX^2Y^2Y^2XYXZYZXYZa]^T$$

After the calibration matrix C is obtained, $[X\ Y\ Z]^T$ matrix of $XYZ_{Camera}$ is expanded into the V matrix. In Equation (10), the calibrated X, Y, and Z values ($XYZ_{Correct}$) may be obtained.

$$[XYZ_{Correct}]=[C]\times[V] \quad (10)$$

After the calibration of the camera, the calibrated 24-color block XYZ value ($XYZ_{Correct}$) and the 24-color block reflection spectrum data ($R_{Spectrum}$) measured by the spectrometer are analyzed to obtain the transformation matrix M. The analysis method is to find the principal components of $R_{Spectrum}$ by the principal component analysis (PCA) and perform multivariate regression analysis on the corresponding principal component scores and $XYZ_{Correct}$. Lastly, the analyses mentioned above are integrated to obtain the transformation matrix M.

To convert $XYZ_{Correct}$ into $R_{Spectrum}$, it is necessary to reduce the dimension of $R_{Spectrum}$ to increase the correlation between each dimension and $XYZ_{Correct}$. Therefore, the principal components (eigenvectors) are obtained from $R_{Spectrum}$ by principal component analysis, and the 12 sets of most significant principal components (EV) are picked to perform dimension reduction. The first six sets of principal components have been able to explain 99.9965% of the degree of data variation. Afterward, through the 12 sets of principal components, the corresponding principal component scores (Score, eigenvalues) are obtained, which may be used for regression analysis with $XYZ_{Correct}$. Since all possible combinations of X, Y, and Z have been enumerated, in the multivariate regression analysis of $XYZ_{Correct}$ and Score, the variables of $V_{Color}$ are selected. In Equation (11), the transformation matrix M is obtained. Then, $XYZ_{Correct}$ is used to calculate the simulation spectrum ($S_{Spectrum}$) in Equation (12).

$$[M]=[\text{Score}]\times\text{pinv}([V_{Color}]) \quad (11)$$

$$[S_{Spectrum}]_{380-780nm}=[EV][M][V_{Color}] \quad (12)$$

The obtained 24-color block simulation spectrum ($S_{Spectrum}$) is compared to the 24-color block reflection spectrum ($R_{Spectrum}$), and the root-mean-square error (RMSE) of each color block is calculated, where the average error is 0.059. The difference between the 24-color block simulation spectrum ($S_{Spectrum}$) and the 24-color block reflection spectrum ($R_{spectrum}$) may also be denoted by color difference. The average color difference is 1.06, which means it is difficult to discriminate the color difference therebetween. That is, the color of the processed reflection spectrum may be accurately reproduced. By the visible light hyperspectral technology developed in the aforementioned process, the reflection spectrum may be simulated based on the RGB values captured by the optical microscope. The RGB values of the entire image may be calculated with the visible light hyperspectral algorithm to obtain the visible light hyperspectral image.

Step S4: Performing a training and validation procedure by the processor, performing an image feature algorithm on the plurality of visible light hyperspectral images, and establishing a thin film prediction model based on a validation of the plurality of layers and the plurality of positions. After the sample images are converted into a visible light hyperspectral images by the hyperspectral image algorithm, the number of layers of the mask may be divided according to the result of the measurement of the Raman spectrometer, in which after the prediction of the model, the basis for determining whether the model training is valid or not, commonly known as Ground Truth. In the present embodiment, the data of the sample images may be divided into a training set, validation set, and test set.

The training set is used to fit the model and to participate directly in the training process of the model. Batch size is the key to the speed of convergence. If the amount of data per calculation is large, the number of iterations may be relatively small, resulting in a smaller gradient decrease and higher relative memory utilization. To obtain a trained model, the process of parameter adjustment is usually required, which is also why the validation set in the next section is designed. The validation set is for the preliminary evaluation of the models in order to find out the one that works best in the situation. Repeated attempts to adjust some parameters of the model (e.g., adjusting hyperparameters, network architecture, etc.) are required to verify that the model is equipped with certain generalization capability. Also, under the circumstance of not accurately setting the training period for the model, if overfitting occurs, early stopping may be required. After the optimal model performance and classification capabilities are obtained by the training and validation, the test set measures the generalization capability of the model. The test set is not involved in the model generation process and does not require any adjustment, which may be able to make predictions completely independent. This allows the model to better generalize its ability to classify uneven distributions of light intensity in an image. The acquisition of features and labels of the training test and the test set may be performed with manual selection by the number of layers and locations provided by the Raman measurement.

In terms of the input of model features, by performing pixel positioning with the manually selected mask to the hyperspectral image, two differences in acquisition for feature types are identified according to different models used. One is that only the portion of frequency domain of a single pixel is picked to form a feature vector (hyperspectral vector, which is marked as a sample in a class. The other one relates to the inclusion of a spatial feature. The correlation between the pixel neighborhood and the pixel itself is high, so a surrounding 24-pixel area around the pixel is taken to form a 5×5×401 feature cube. Two approaches to the problem of uneven distribution of classes of data, namely imbalanced class, are adopted. One is to adjust the weight of classes in the classification, whereas the other is to conduct data enhancement for lesser classes, i.e., using oversampling to make multiple copies of the label samples.

In terms of the dimension reduction of eigenvectors, principal component analysis is used. In a multivariate data set, a subspace that has fewer original variables and may preserve the variation of the original data is identified. In addition, the original data is mapped onto these subspaces to achieve the function of reducing the data dimension and forming a new data set. The analysis method is to decompose the covariance matrix via eigen-decomposition to obtain the principal components (eigenvectors) and principal component scores (eigenvalues) of the data. In addition, the obtained data are arranged sequentially according to the degree of variation of the data in the principal components. That is, the first principal component may be regarded as the main axis direction of the greatest degree of variation in the original data. Further, the data is projected to the main axis direction to obtain a new data set. Also, the degree of variation may be regarded as the degree to which the principal components explain the whole data. The main component of low variability is removed to achieve the function of reducing dimensions. From the observation of each sample from the principal components, the principal component scores of each sample may be obtained to know the distribution of data under specific principal components. In the present embodiment, spectral data analysis may be conducted by Equation (13) as follows:

$$y_j = a_{j1}(x_{1i} - \overline{x_1}) + a_{j2}(x_{2i} - \overline{x_2}) + \ldots + a_{jn}(x_{ni} - \overline{x_n}) \quad (13)$$

Specifically, $x_{1i}, x_{2i} \ldots x_{ni}$ are the spectral intensity values at the first, second, and n-th wavelengths; $\overline{x_1}, \overline{x_2} \ldots \overline{x_n}$ are the expected spectral values at the first, second, and n-th wavelengths, that is, the average spectral intensity value. These coefficients, $a_{j1}, a_{j2} \ldots a_{jn}$, are the feature vector coefficients of the spectrum after the covariant matrix thereof is determined.

Figure 2A:
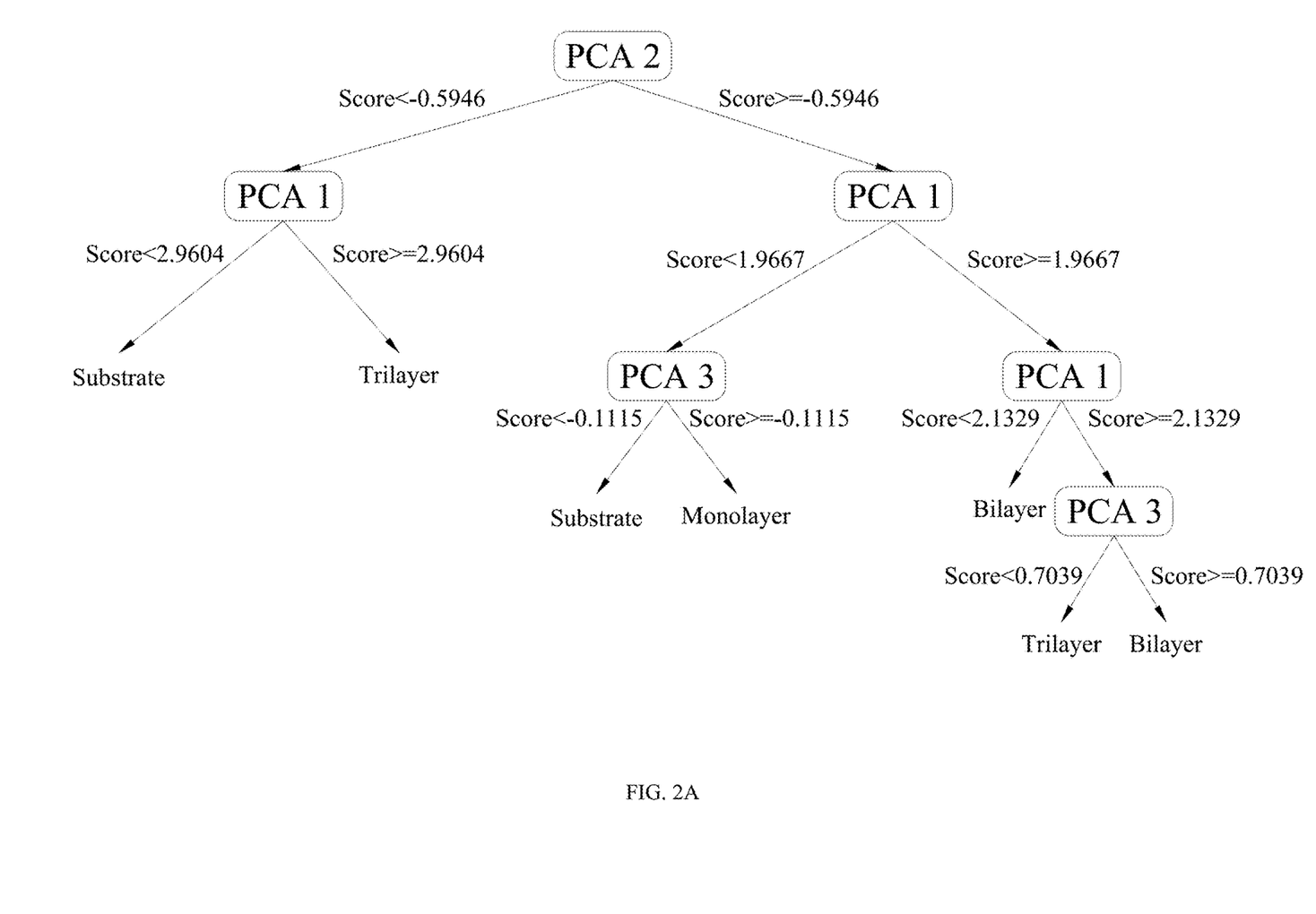
FIG. 2A and FIG. 2B are schematic diagrams of the decision tree analysis according to an embodiment of the present disclosure.
Figure 2B:
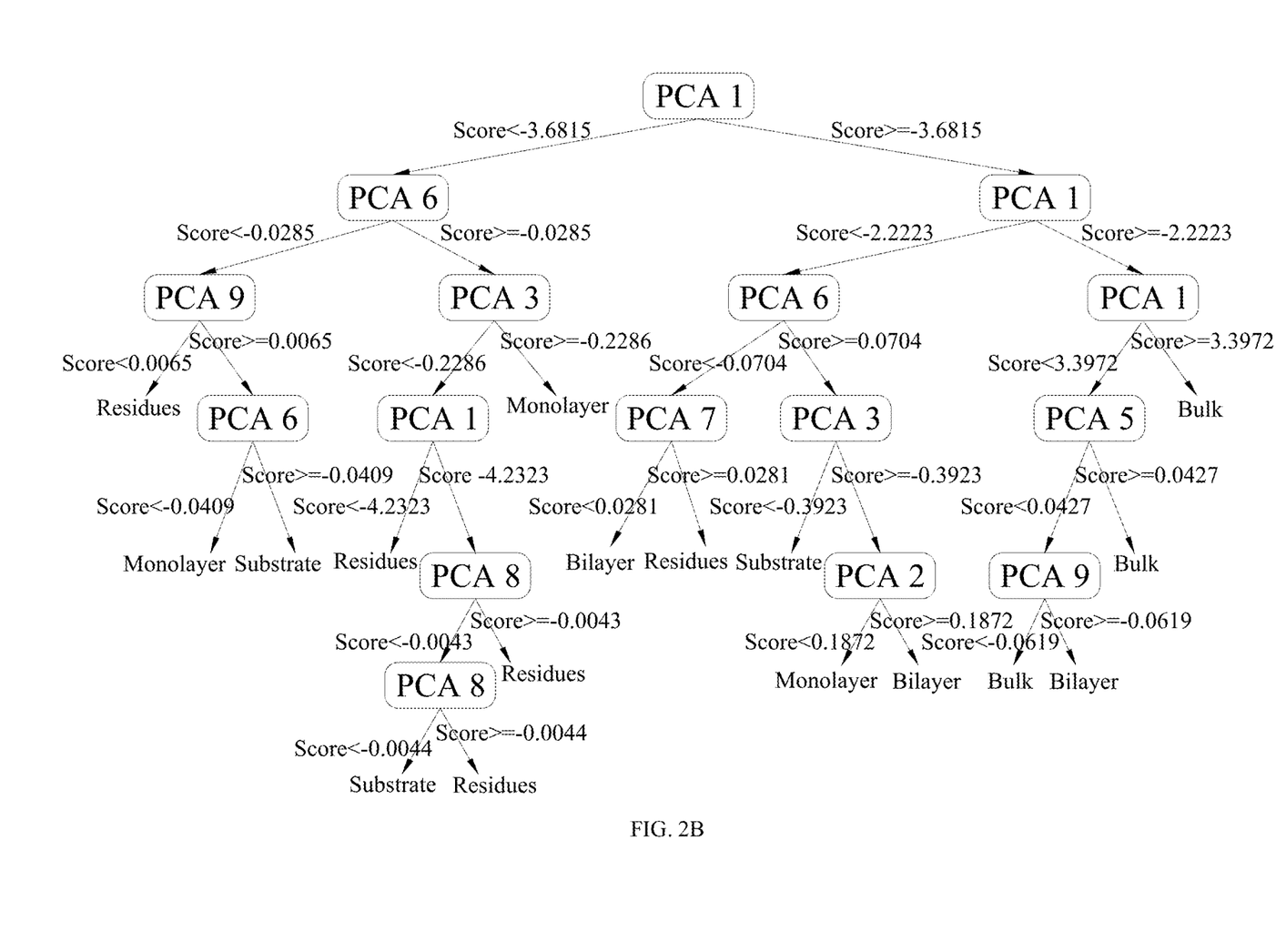

Referring to FIG. 2A and FIG. 2B, the figures are schematic diagrams of the decision tree analysis according to an embodiment of the present disclosure. Specifically, FIG. 2A shows a schematic diagram of a silicon dioxide substrate and FIG. 2B shows a schematic diagram of a sapphire substrate. As shown in the figure, the decision tree analysis uses inductive reasoning to generate a tree structure model. Similar to a flowchart, the classification of attribute values is performed at the internal nodes of a tree. The branching situation of the next node is determined based on the attribute values, and the classification result is obtained by the leaf nodes. The internal nodes represent a set of properties, while the leaf nodes represent a type or classification of the distribution of the sample. In the present embodiment, a data type of spectrum vector is adopted, and 401 band features are inputted directly into the decision tree model. From the results of the model, it may be seen that the classification is not based on the use of features for all bands, but only for certain bands. To avoid redundant bands those are bands with overly high correlation or insignificant correlation that is not helpful for classification, the band features are performed with dimension reduction by principal component scores, and then the top ten sets of the more influential feature scores are selected. Furthermore, the ten sets of features after dimension reduction are inputted into the decision tree model.

A molybdenum disulfide film formed on two different substrates is taken as an example. In FIG. 2A, after the decision tree analysis, according to the principal component scores, the classification may be conducted to determine a silicon dioxide substrate (Substrate), a monolayer molybdenum disulfide film (Monolayer), a bilayer molybdenum disulfide film (Bilayer), or a trilayer molybdenum disulfide film (Trilayer) in the image. Similarly, in FIG. 2B, after the decision tree analysis, according to the principal component scores, the classification may be conducted to determine a sapphire substrate (Substrate), a monolayer molybdenum disulfide film (Monolayer), a bilayer molybdenum disulfide film (Bilayer), a trilayer molybdenum disulfide film (Trilayer), a bulk (Bulk), or residues (Residues) in the image.

Figure 3A:
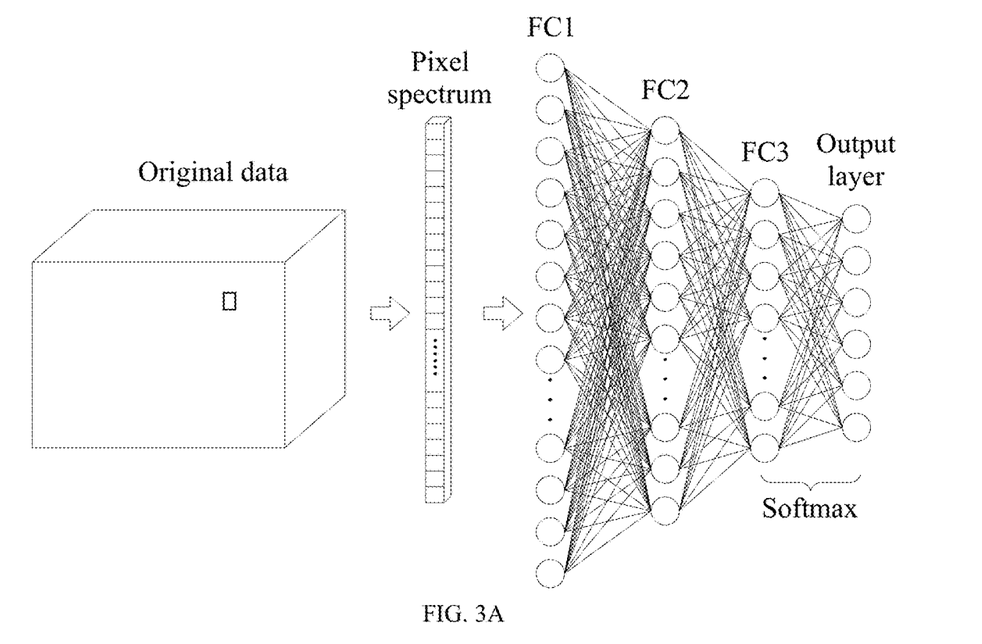
FIG. 3A to FIG. 3C are schematic diagrams of the deep neural network analysis according to an embodiment of the present disclosure.
Figure 3B:
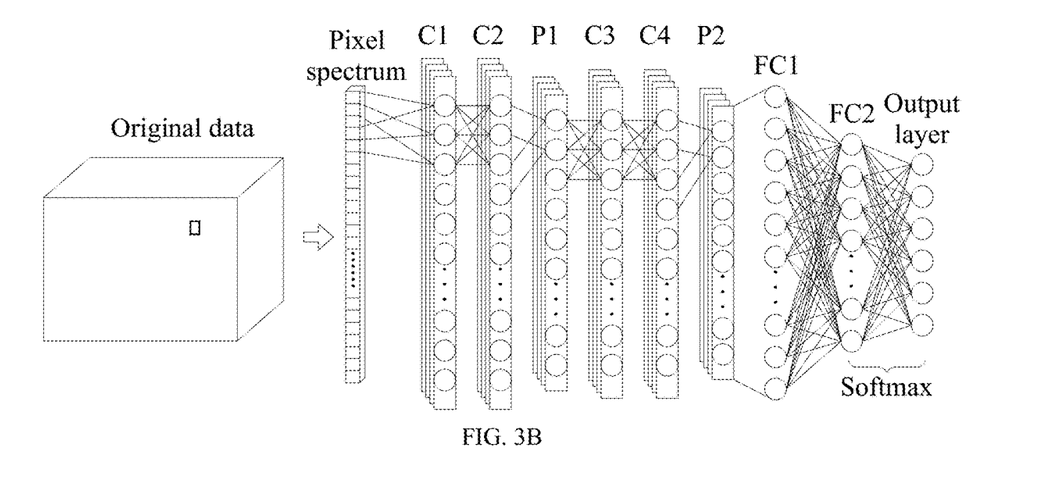
Figure 3C:
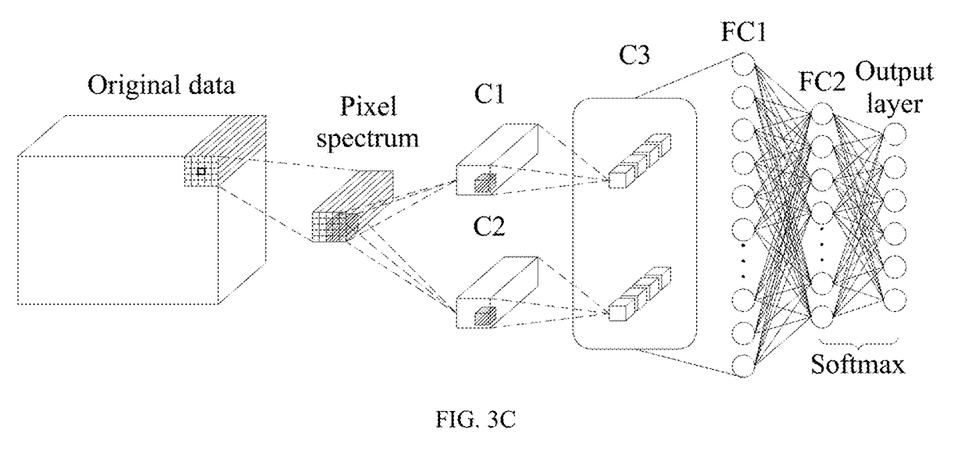

Referring to FIG. 3A to FIG. 3C, the figures are schematic diagrams of the deep neural network analysis according to an embodiment of the present disclosure. Specifically, FIG. 3A is a schematic diagram of a deep neural network, FIG. 3B is a schematic diagram of a one-dimensional convolutional neural network, and FIG. 3C is a schematic diagram of a three-dimensional convolutional neural network. In addition to the decision tree analysis model of the aforementioned embodiment, it may be considered to establish a 2D material thin film inspection model with a deep learning model. The three network models in the present disclosure are described as follows:

As shown in FIG. 3A, the original sample images are converted by the aforementioned steps to form a visible light hyperspectral image of each pixel, which are inputted as the input data. The deep neural network structure includes three fully connected layers (FC1 to FC3), and each layer contains tens to hundreds of neurons which convert the activation function to be the output of the neurons after the sum of the inputs of the neurons in the previous layer. Each neuron has a special connection with the next layer of neurons such that the output value of the previous layer of neurons is weighted and passed on to the next layer of neurons. Common activation functions include Sigmoid, Tanh, or ReLU functions. To reduce the occurrence of overfitting, the ReLU function is usually selected as the activation function, and some neurons may be outputted as 0 to allow the network model to be more sparse, thus avoid training problems. Lastly, in the output layer, the softmax function is used for classification and prediction to determine the probability value of different layers of the 2D material thin film in the image.

In another embodiment, as shown in FIG. 3B, the original sample images are converted by the aforementioned steps to form a visible light hyperspectral image of each pixel, and the spectral data of these pixels are used as input data. The one-dimensional convolutional neural network includes four convolutional layers (C1 to C4), two pooling layers (P1 to P2), and two fully connected Layer (FC1 to FC2). The function of the convolutional layer is used as a feature mapping, and the value of the neurons $v_{ij}^x$ at Position x of the j-th feature map in the i-th layer is represented as Equation (14). In terms of the pooling layer, each pooling layer corresponds to a previous convolutional layer, and merging may reduce the resolution of feature maps to provide invariance. The present embodiment adopts the maximum pooling layer.

$$v_{ij}^x = f(b_{ij} + \Sigma_m \Sigma_{p=0}^{P1-1} w_{ijm}^p v_{(i-1)m}^{x+p}) \quad (14)$$

Specifically, the m index is connected to the feature mapping in the (i−1)-th layer of the current feature mapping, $w_{ijm}^P$ is the weight that is connected to Position p of the m-th feature mapping, $P_l$ is the spectral size of the width from the kernel to the m-th feature mapping, and $b_{ij}$ is the bias of the j-th feature map in the i-th layer.

With the nature of sharing convolution core weights, the one-dimensional convolution layer is equivalent to filtering at different frequencies when convolving the spectral features. The maximum pooling layer takes the maximum value from the feature point in the neighborhood. Since a higher correlation exists between adjacent bands in the spectral domain, the spectrum texture feature may be retained in the layer to a greater extent, further reducing the high band between correlation coefficients. Lastly, the data outputted from the pooling layer are operated by two fully connected layers and then classified and predicted by the softmax function to determine the probability value of different layers of the 2D material thin film in the image.

In yet another embodiment, as shown in FIG. 3C, the three-dimensional convolutional neural network includes three convolutional layers (C1 to C3) and two fully connected layers (FC1 to FC2). The embodiment used by the convolution layer is slightly different from the previous embodiment in that each feature cube is treated as an independent cube instead of combining them by averaging or weighting. This allows each filtered feature more independent, and the three-dimensional convolutional operation is presented as Equation (15).

$$v_{lij}^{xyz} = f(b_{ij} + \Sigma_{h=0}^{Hl-1} \Sigma_{w=0}^{Wl-1} \Sigma_{d=0}^{Dl-1} k_{ij}^{hwd} v_{(l-1)i}^{(x+h)(y+w)(z+d)}) \quad (15)$$

Specifically, $D_l$ is the spectral depth of the 3D kernel, i is the number of feature cubes in the previous layer, and j is the number of kernels in this layer. $v_{lij}^{xyz}$ is the output of position (x, y, z); that is, it is calculated by convolving the i-th feature cube of the previous layer with the j-th kernel of the $l$-th layer, and $k_{ij}^{hwd}$ is the (h, w, d) value of the kernel connected to the i-th feature cube in the previous layer. Therefore, the output data of the $l$-th convolutional layer includes i×j 3D feature cubes.

The three-dimensional convolutional neural network is formed of pixels in a small spatial neighborhood of the entire spectral band (not the entire image) to form D×D×N feature cubes as input data. The spectral space feature is learned with three-dimensional kernel convolution, and the reason for using neighboring pixels is based on the observation that the pixels within a small spatial neighborhood often reflect similar characteristics. In the present embodiment, a 3×3 spatial convolution kernel is used, and the spectral depth of the kernel is determined by the number of bands. The reason for executing convolution for only two times is that the sample space size may be reduced to 1×1 after only two layers of convolution. In addition, regarding the extraction of the spatial and frequency domains of each layer, the first type of the three-dimensional convolutional layers C1 and C2 each include a 3D kernel, and the size of each kernel is $K_1^1 \times K_2^1 \times K_3^1$, which generates two 3D feature cubes with the size of $(D-K_1^1+1) \times (D-K_2^1+1) \times (N-K_3^1+1)$. Two 3D feature cubes of C1 and C2 with the size of $(D-K_1^1+1) \times (D-K_2^1+1) \times (N-K_3^1+1)$ is regarded as input. The second type of the three-dimensional convolutional layer C3 involves four 3D kernels (with the size of $K_1^2 \times K_2^2 \times K_3^2$) and generates eight 3D data cubes, each of which has a size of $(D-K_1^1-K_1^2+2) \times (D-K_2^1-K_2^2+2) \times (N-K_3^1-K_3^2+1)$. Lastly, the data outputted from the convolutional layer are operated by two fully connected layers and then classified and predicted by the softmax function to determine the probability value of different layers of the 2D material thin film in the image.

Step S5: Capturing a thin-film image to be measured by the optical microscope, performing the visible light hyperspectral algorithm by the processor, and then generating a distribution result of the thin-film image to be measured according to an analysis of the thin film prediction model. After the establishment of the aforementioned machine learning network model, when an unknown 2D material thin film is generated, an optical microscope may be used to take the thin-film image to be measured. Then, the thin-film image to be measured is converted into the visible light hyperspectral image to be measured with the visible light hyperspectral algorithm of the above steps. Moreover, in the analysis of the aforementioned network model, the number of layers of the 2D material thin film is determined to generate the corresponding distribution of the number of layers.

Step 6: Outputting the distribution result by an output device. With the aforementioned detection procedures for determining the distribution of the number of layers of the 2D material thin film, the detection results may be further outputted via the output device. The output device of the present embodiment may include a variety of display interfaces, such as a computer screen, a monitor, or a hand-held display.

Figure 4:
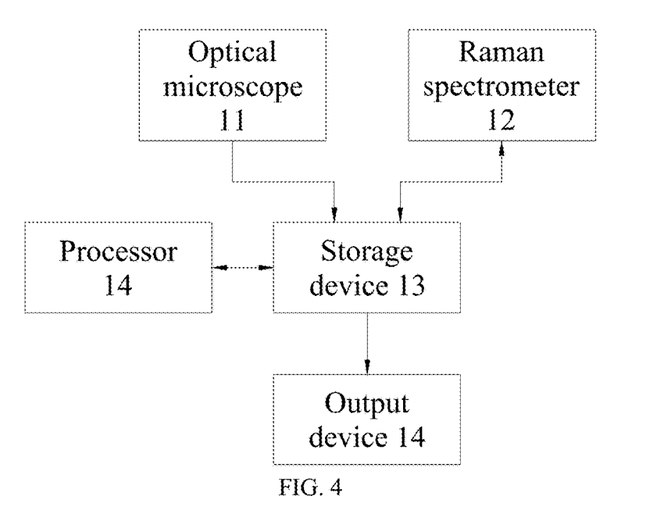
FIG. 4 is a schematic diagram of the system for analyzing 2D material thin film according to an embodiment of the present disclosure.

Referring to FIG. 4, the figure is a schematic diagram of the system for analyzing 2D material thin film according to an embodiment of the present disclosure. As shown in the figure, the system for analyzing 2D material thin film 10 may include an optical microscope 11, a Raman spectrometer 12, a storage device 13, a processor 14, and an output device 15. In the present embodiment, the optical microscope 11 captures a sample image of the 2D material thin film by the image-capturing device, obtains the sample image and the thin-film image to be measured, and is used as an input device of the system, and transmits and stores the image information in the storage device 13. The data may be uploaded to the memory of the storage device 13 for storage by wireless network transmission, wireless communication transmission, or general wired Internet. The memory may include read-only memory, flash memory, disk, or cloud database. On the other hand, for these sample images, a plurality of 2D material thin films are measured via the measurement of the Raman spectrometer 12 to obtain a plurality of layers and a plurality of positions, which are used as labels for analysis. These measurement data may also be transmitted and stored in the storage device 13.

Then, the system for analyzing 2D material thin film 10 accesses the storage device 13 through the processor 14. In the present embodiment, the processor 14 may include a central processor, an image processor, a microprocessor, etc., among computers or servers, which may include a multi-core processing unit or a combination of multiple processing units. The processor 14 executes instructions to access the sample images in the storage device 13 for training and validation procedures, and the processor 14 may also access the thin-film image to be measured for detection and analysis procedures. Specifically, for the training and validation procedures, the sample images originally in the storage device are processed with the visible light hyperspectral algorithm to generate a plurality of visible light hyperspectral images. In addition, the image feature algorithm is performed on the plurality of visible light hyperspectral images, and a thin film prediction model is established based on a validation of the plurality of layers and the plurality of positions. Then, for the detection and analysis procedures, the thin-film image to be measured is accessed, the visible light hyperspectral algorithm is performed, and then a distribution result of the thin film prediction model is generated according to the analysis of the thin film prediction model. For the above detection and analysis method, refer to the description of the aforementioned embodiments, and the same technical features may not be described repeatedly.

According to the results of detection and analysis, the 2D material thin film image may be converted into an image with a distribution of the actual number of layers, and the results may also be transmitted to the operator's computer host, laptop, or tablet computer via wired or wireless network transmission by the output of the output device 15. This allows the distribution state of the 2D material thin film to be determined according to the distribution results.

The above description is merely illustrative rather than restrictive. Any equivalent modifications or alterations without departing from the spirit and scope of the present disclosure are intended to be included in the following claims.

What is claimed is:

1. A method for analyzing 2D material thin film, comprising:
    capturing sample images of a plurality of 2D material thin films by an optical microscope and storing the plurality of sample images in a storage device;
    measuring the plurality of 2D material thin films by a Raman spectrometer and storing spectral images of a plurality of layers and a plurality of positions in the storage device;
    accessing the storage device by a processor and performing a visible light hyperspectral algorithm on the plurality of sample images to generate a plurality of visible light hyperspectral images;
    performing a training and validation procedure by the processor, performing an image feature algorithm on the plurality of visible light hyperspectral images, and establishing a thin film prediction model based on a validation of the spectral images of the plurality of layers and the plurality of positions;
    capturing a thin-film image to be measured by the optical microscope, performing the visible light hyperspectral algorithm on the thin-film image by the processor to generate a thin-film visible light hyperspectral image, and then generating a distribution result of the thin-film image to be measured according to an analysis of the thin film prediction model, the distribution result including distribution of layers of the thin-film image; and
    outputting the distribution result by an output device;
    wherein the visible light hyperspectral algorithm includes a transformation matrix defining correlations between the optical microscope and the Raman spectrometer, and the transformation matrix is arranged to (a) convert the plurality of sample images into the plurality of visible light hyperspectral images for the training and validation procedure, and (b) convert the thin-film image into the thin-film visible light hyperspectral image for generating the distribution result.

2. The method for analyzing 2D material thin film according to claim 1, wherein the visible light hyperspectral algorithm has a wavelength range of 380 to 780 nm and a spectral resolution of 1 nm.

3. The method for analyzing 2D material thin film according to claim 1, wherein the training and validation procedure comprises a step of dividing the plurality of visible light hyperspectral images into a training set, a validation set, and a test set.

4. The method for analyzing 2D material thin film of claim 1, wherein the image feature algorithm comprises a decision tree analysis, principal component analysis, and deep neural network analysis.

5. The method for analyzing 2D material thin film of claim 4, wherein the deep neural network analysis comprises a deep neural network, a one-dimensional convolutional neural network, and a three-dimensional convolutional neural network.

6. A system for analyzing 2D material thin film, comprising:
    an optical microscope for capturing a plurality of sample images of a plurality of 2D material thin films and capturing a thin-film image to be measured;
    a Raman spectrometer for measuring the plurality of 2D material thin films to obtain spectral images of a plurality of layers and a plurality of positions;
    a storage device being connected to the optical microscope and the Raman spectrometer and storing the plurality of sample images and the spectral images of the plurality of layers and the plurality of positions corresponding thereto;
    a processor being connected to the storage device and executing a plurality of instructions to perform the following steps:
        accessing the plurality of sample images and performing a visible light hyperspectral algorithm to generate a plurality of visible light hyperspectral images;
        performing a training and validation procedure, performing an image feature algorithm on the plurality of visible light hyperspectral images, and establishing a thin film prediction model based on a validation of the spectral images of the plurality of layers and the plurality of positions; and
        accessing a thin-film image to be measured, performing the visible light hyperspectral algorithm on the thin-film image to generate a thin-film visible light hyperspectral image, and then generating a distribution result of the thin-film image according to an analysis of the thin film prediction model, the distribution result including distribution of layers of the thin-film image; and
    an output device outputting the distribution result;
    wherein the visible light hyperspectral algorithm includes a transformation matrix defining correlations between the optical microscope and the Raman spectrometer, and the transformation matrix is arranged to convert the plurality of sample images and the thin-film image into respective visible light hyperspectral images.

7. The system for analyzing 2D material thin film according to claim 6, wherein the visible light hyperspectral algorithm has a wavelength range of 380 to 780 nm and a spectral resolution of 1 nm.

8. The system for analyzing 2D material thin film according to claim 6, wherein the training and validation procedure comprises a step of dividing the plurality of visible light hyperspectral images into a training set, a validation set, and a test set.

9. The system for analyzing 2D material thin film according to claim 6, wherein the image feature algorithm comprises a decision tree analysis, principal component analysis, and deep neural network analysis.

10. The system for analyzing 2D material thin film according to claim 9, wherein the deep neural network analysis comprises a deep neural network, a one-dimensional convolutional neural network, and a three-dimensional convolutional neural network.

* * * * *